(12) United States Patent
Iwamura

(10) Patent No.: US 8,760,440 B2
(45) Date of Patent: Jun. 24, 2014

(54) ELECTRONIC DEVICE WITH A THIN DISPLAY

(75) Inventor: Ryuichi Iwamura, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1876 days.

(21) Appl. No.: 11/447,208

(22) Filed: Jun. 5, 2006

(65) Prior Publication Data

US 2007/0279400 A1    Dec. 6, 2007

(51) Int. Cl.
*G06F 3/033*    (2013.01)
*G09G 5/00*    (2006.01)

(52) U.S. Cl.
USPC ........................................................ 345/184

(58) Field of Classification Search
USPC ......... 345/156, 157, 168, 169, 184, 170, 171, 345/172, 173, 905; 455/73, 550.1, 556.1, 455/556.2; 341/22, 23, 27, 28, 33, 34, 35
See application file for complete search history.

(56) References Cited

U.S. PATENT DOCUMENTS

| | | | |
|---|---|---|---|
| 5,156,049 A * | 10/1992 | Douglas | 73/462 |
| 5,805,145 A * | 9/1998 | Jaeger | 345/172 |
| 5,841,428 A * | 11/1998 | Jaeger et al. | 345/184 |
| 6,639,578 B1 * | 10/2003 | Comiskey et al. | 345/107 |
| 6,771,992 B1 * | 8/2004 | Tomura et al. | 455/575.1 |
| 6,996,530 B2 | 2/2006 | Shizuka et al. | 704/260 |
| 7,046,230 B2 * | 5/2006 | Zadesky et al. | 345/173 |
| 2002/0184004 A1 | 12/2002 | Shizuka et al. | 704/200 |
| 2003/0014252 A1 | 1/2003 | Shizuka et al. | 704/258 |
| 2003/0023443 A1 | 1/2003 | Shizuka et al. | 704/260 |
| 2003/0076306 A1 * | 4/2003 | Zadesky et al. | 345/173 |

* cited by examiner

*Primary Examiner* — William Boddie
(74) *Attorney, Agent, or Firm* — John L. Rogitz

(57) ABSTRACT

A user interface assembly includes a thin display and a control element such as a rotary encoder, rotary switch, or toggle switch. The control element is manipulable by a person to generate an electronic input signal to a processor, with the thin display presenting a feedback indication received from the processor. The thin display is associated with no other control element, such that the control element and thin display establish a modular unit.

8 Claims, 4 Drawing Sheets

WHEEL ENCODER
(FRONT VIEW)

ROTARY ENCODER
(FRONT VIEW)

ROTARY ENCODER
(FRONT VIEW)

HARDWARE BLOCK DIAGRAM

WHEEL ENCODER
(FRONT VIEW)

WHEEL ENCODER
(SIDE VIEW)

WHEEL ENCODER ASSEMBLY

TOGGLE SWITCH
(FRONT VIEW)

TOGGLE SWITCH

ROTARY SWITCH
(FRONT VIEW)

ROTARY SWITCH

ELECTRONIC DEVICE WITH A THIN DISPLAY

FIELD OF THE INVENTION

The present invention relates generally to data input devices with thin displays for presenting information relating to data input.

BACKGROUND OF THE INVENTION

In my co-pending U.S. patent application Ser. No. 11/069,614, filed Feb. 28, 2005 and incorporated herein by reference, I disclosed a user interface with a thin display device that displayed data related to the input. The device includes a panel on which several input controls such as pivotable switches and rotatable knobs could be mounted, with feedback information provided to the user on a thin display. The user can manipulate the controls to, e.g., adjust volumes, pulse width modulations, etc. of an electronic device such as a waveform generator or music synthesizer, and feedback information is provided to the user on the thin display. A "thin display" is defined to not include liquid crystal displays (LCDs) but to include a class of thin, light displays that consume little power, such as thin-film transistor backplane displays, electrophoretic displays, electro-optical displays, organic electro-luminescent displays, and microcapsule displays. Exemplary non-limiting thin displays are those made by E.Ink and disclosed in, to give but one example, U.S. Pat. No. 6,639,578, incorporated herein by reference.

While useful, requiring a single panel to hold all the displays may require the panel to be custom-made, reducing the flexibility of the device and rendering it problematic to change the control layout for different types of electronic devices. The present invention addresses this issue.

SUMMARY OF THE INVENTION

A user interface assembly includes a thin display and a control element that is adjustable to generate an electronic input signal to a processor. The thin display presents a feedback indication received from the processor which represents the input signal, and the thin display is associated with no other control element, such that the control element and thin display establish a modular unit.

In some implementations a substrate supports the thin display and the control element. In this implementation, a first portion of the modular unit is disposed on a first side of the substrate and a second portion of the modular unit is disposed on a second side of the substrate, and a nut is threadably engaged with the second portion. The control element can be a rotary encoder with associated knob or wheel to adjust the encoder, or it can be a rotary or toggle switch.

In another aspect, a method of implementing a user interface for a device includes using a control element to generate an input control signal, and based on the control signal, generating feedback data. The method includes displaying the feedback data on a thin display associated with only the control element and no other control element.

In yet another aspect, a modular unit includes a single control element and a thin display.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
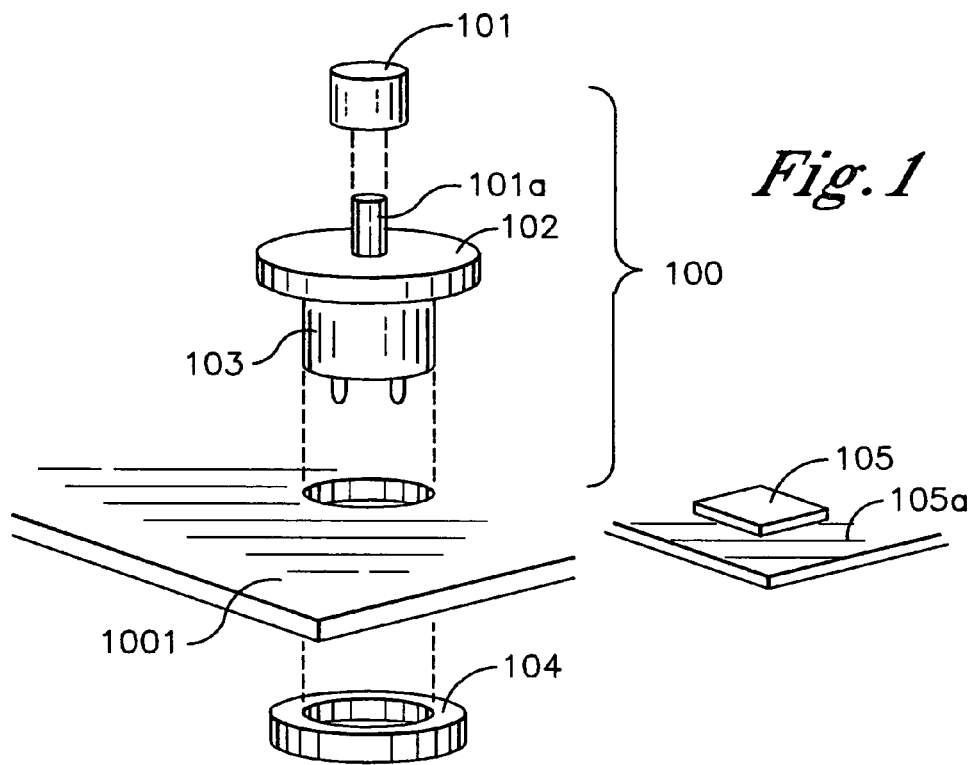
FIG. 1 is an exploded perspective view of a first embodiment of the modular user interface assembly with thin display, used in connection with a rotary encoder.

Referring initially to FIG. 1, a modular unit is shown, generally designated 100, which includes a control element embodied by a user-manipulable knob 101 coupled through a connecting shaft 101a to a rotary encoder 103. A thin display unit 102 is sandwiched between the knob 101 and rotary encoder 103 as shown. The rotary encoder 103, knob 101, and shaft 101a turn together as a unit, with the rotary encoder generating a signal representative of its angular position.

Although the rotary encoder 103 may be replaced by a potentiometer that typically generates a minimum signal at the seven o'clock position and a maximum signal at the five o'clock position, it is to be understood that the rotary encoder 103 does not have such a sweep angle. Instead, it can rotate freely and has no stops, so that a user can manipulate the knob 101 (and, hence, encoder 103) to generate an input signal to a processor 105, normally mounted on a processor substrate 105a, with the processor 105 in turn generating a feedback signal indicative thereof for display discussed momentarily.

The display 102 preferably does not rotate with the encoder 103. Thus, the shaft 101a extends through a hole in the display 102 and rotates within the hole. In some less preferred implementations, however, the display 102 might so rotate.

The modular assembly unit 100 is mounted to a substrate 1001 such as a circuit board or panel, which may also support the processor 105. In the non-limiting embodiment shown, part of the assembly unit 100 extends through the substrate 1001 and is threadably engaged by a fastener such as a nut 104, to thereby sandwich the substrate 1001 between the display 102, which is disposed on the top of the substrate 1001, and the nut 104, which is disposed on the bottom of the substrate 1001.

Figure 2:
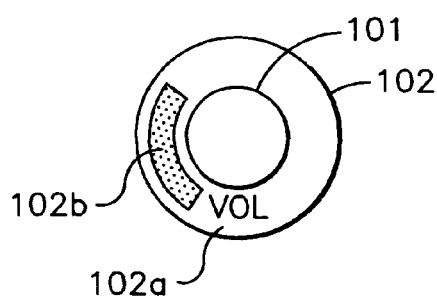
FIG. 2 is a front view of the assembly shown in FIG. 1, displaying a first feedback indication when the knob is in a first position.
Figure 3:
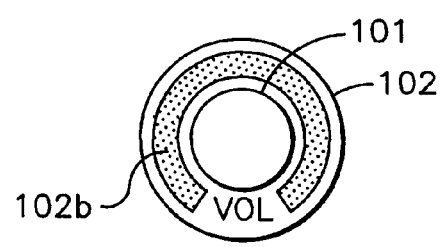
FIG. 3 is a front view of the assembly shown in FIG. 1, displaying a second feedback indication when the knob is in a second position.

FIGS. 2 and 3 show front views of the assembly unit 100. As shown, the thin display 102 may be shaped as a flat ring, i.e., as a hollow disk, or it may be rectangular. The display 102 presents one or more feedback indications received from the processor 105, with the feedback indication representing the input signal generated by the rotary encoder 103. Thus, the thin display 102 can indicate a name of the function of the rotary encoder 103, e.g., "VOL" for volume, as indicated at 102a. Also, the thin display 102 may indicate in alpha-numeric or graphical format (as shown at 102b) a feedback indication of the input signal such as the circular bar shown at 102b. The circular bar shown at 102b indicates a knob position, increasing in magnitude around the periphery of the display 102 as shown from FIG. 2 to FIG. 3 as the knob 101 turns right. The feedback indication, owing to the very low power requirements of the thin display 102, is held almost without power consumption until it is redrawn.

Figure 4:
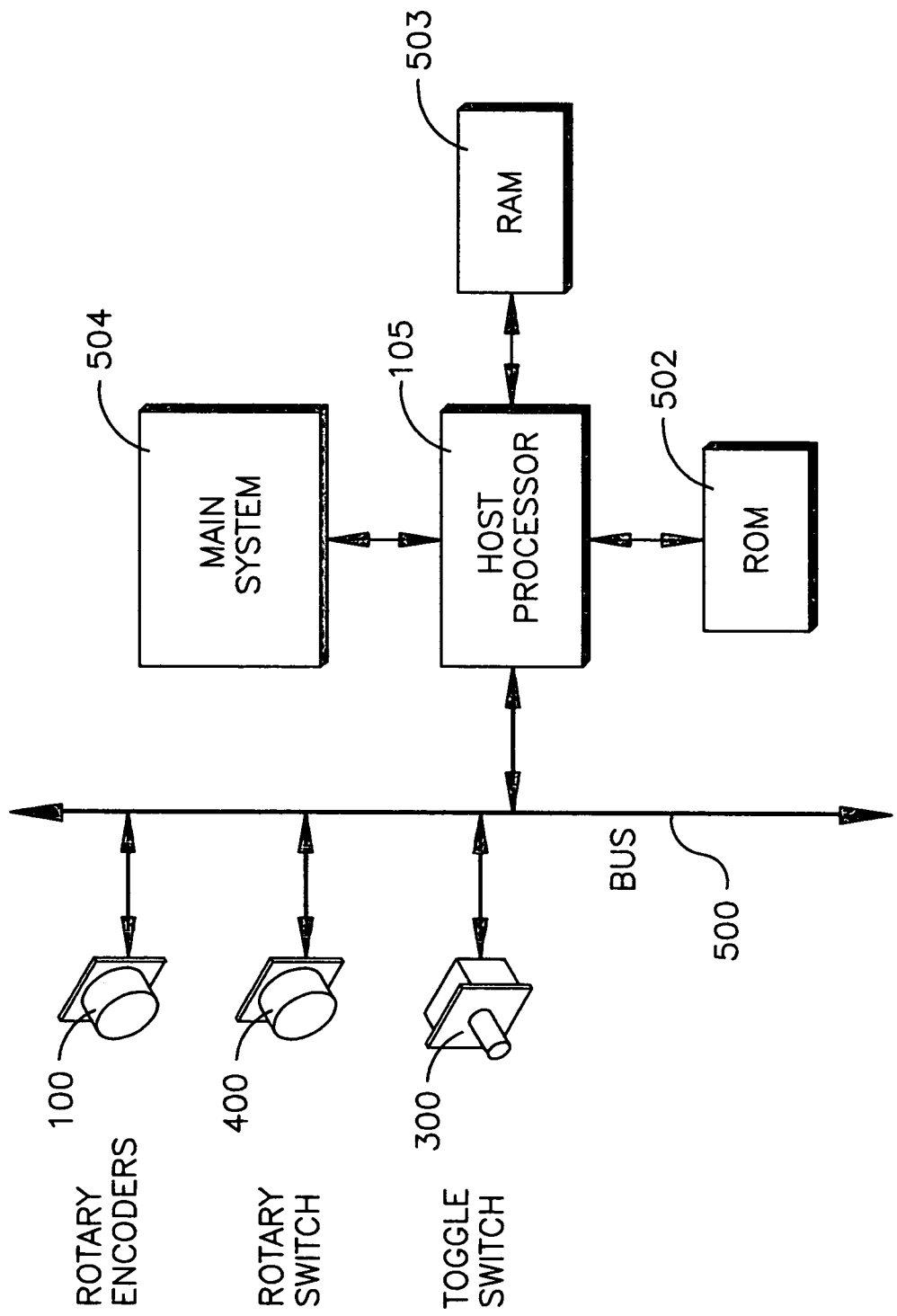
FIG. 4 is a block diagram of a non-limiting hardware arrangement, showing plural user interface assemblies connected to an electronic component system.

Referring to FIG. 4, the assembly unit 100 along with other user interface assembly units described further below is shown communicating with a bus 500 of an electronic system 504, such as a music synthesizer or waveform generator or other component system. The position of the rotary encoder 103 may be stored in non-volatile memory 503 such as but not limited to RAM, and the processor 105, which is associated with the electronic system 504, can access the memory 503. The information thus is maintained after power down. At the next power up, the position is read from the memory 503 and shown again on the display 102. A read-only memory 502 may also be provided for access by the processor 105 as shown.

As recognized herein, among the advantages of the rotary encoder 103 is that its resolution can be configured. Specifically, in case of the conventional audio potentiometer discussed above, attenuation is negative infinite db at the seven o'clock position and 0 dB (no attenuation) at the five o'clock position, whereas the rotary encoder 103 can be configured by programming the processor 105 to recognize that attenuation changes from negative infinite db to 0 dB in two or more complete turns of the encoder 103. Furthermore, the function name provided by the processor 105 to the thin display 102 (indicated at 102a in FIG. 2) may be dynamically changed. For example, in a first mode, volume control may be assigned to the rotary encoder and tone control may be assigned in a second mode, with the associated function name being indicated on the display 102. The mode may be changed by software or mechanically. For example, the two modes may be toggled between by pushing/pulling the knob 101. In any case, the display 102 is associated with only the rotary encoder and no other input control element.

The control bus 500, which as shown may be connected to each user interface 100, 300 and 400 (the latter two being discussed further below), may be, for example, an 12C bus. As discussed above, the rotary encoder 100 sends a control signal such as angle information to the host processor 105 and the host processor 105 returns feedback data such as circular bar data to the rotary encoder assembly 100 for display on the thin display 102.

Figure 5:
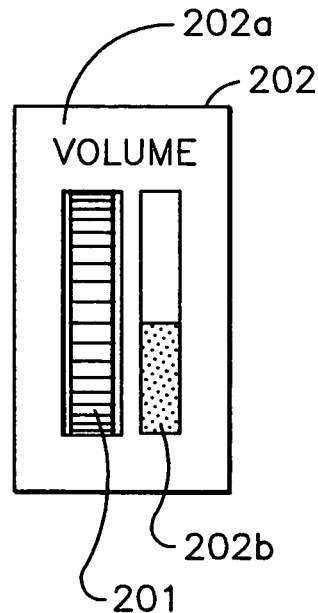
FIG. 5 is a front view of a wheel-type encoder assembly with thin display.
Figure 6:
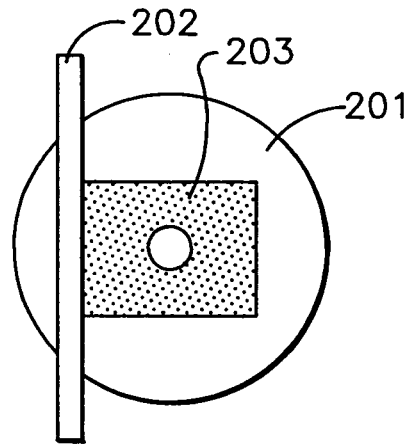
FIG. 6 is a side view of the assembly shown in FIG. 5.
Figure 7:
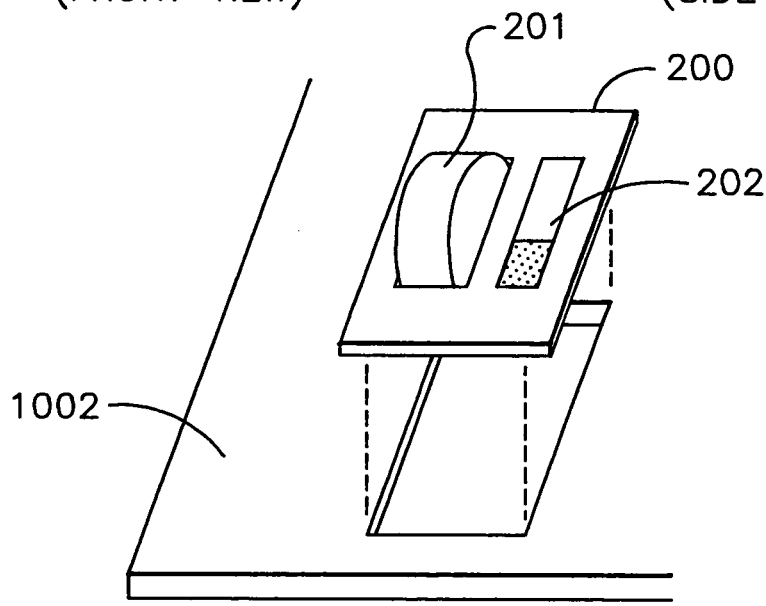
FIG. 7 is a perspective view of the assembly shown in FIG. 5.

Now referring to FIGS. 5-7 a second embodiment of the control element with thin display is shown, designated 200. Although not shown in FIG. 4, the modular assembly unit 200 may be engaged with the bus 500.

In the embodiment shown in FIGS. 5-7 the control element is embodied as a wheel-type rotary encoder 203 with thin display 202 indicating the function name of the control element, e.g., "VOLUME" shown at 202a, and the position, shown at 202b, of the control element. The bar shown at 202b grows when a wheel 201, which is connected to the encoder 203 to vary the control signal it generates, is turned forward. It is to be understood that the rotary encoder 203 may be substantially identical to the encoder 103 shown in FIGS. 1-3, and thus that it converts a rotation angle to digital data.

Figure 8:
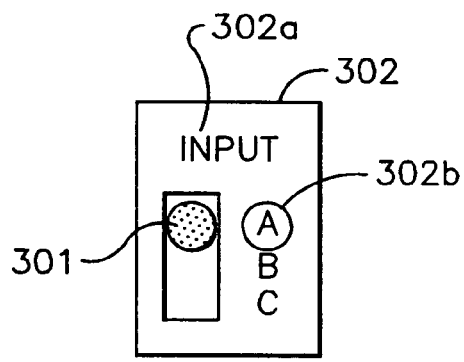
FIG. 8 is a front view of a control element embodied as a toggle switch assembly with thin display.
Figure 9:
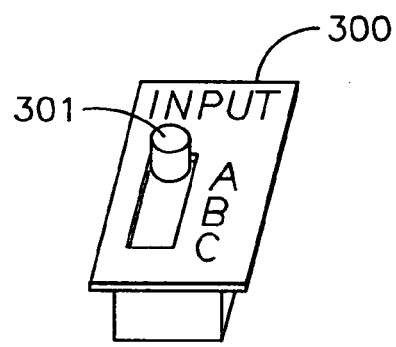
FIG. 9 is a perspective view of the toggle switch assembly shown in FIG. 8.

Now referring to FIGS. 8 and 9, the control element may be embodied by a toggle switch. More specifically, a pivotable or translationally movable toggle switch 301 may be moved to one of plural positions indicated on a thin display 302 that may be rectangular in shape as shown, e.g., "A", "B", or "C". The display 302 indicates the function name of the toggle switch, e.g., "INPUT" as indicated at 302a, and the position of the toggle switch as indicated at 302b. When the switch 301 is set to position "A", the letter "A" is circled or highlighted or otherwise displayed to show it is selected, and the other inputs ("B" and "C") can be grayed out. It is to be understood that as shown, the toggle switch 301 may electrically communicate with the bus 500 shown in FIG. 4.

Figure 10:
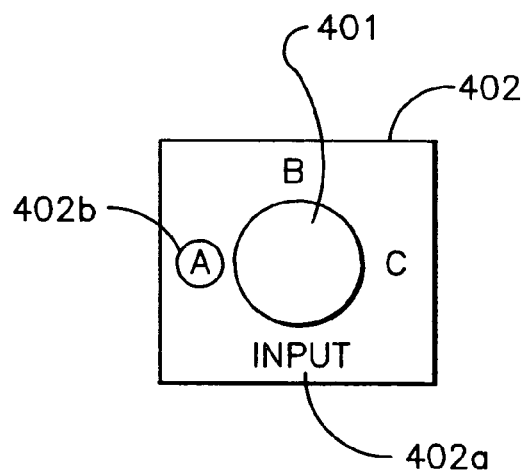
FIG. 10 is a front view of a control element embodied as a rotary switch assembly with thin display.
Figure 11:
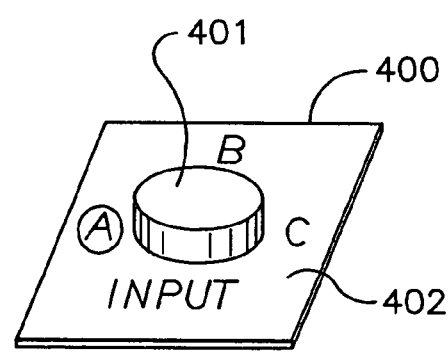
FIG. 11 is a perspective view of the rotary switch assembly shown in FIG. 10.

FIGS. 10 and 11 show that the control element may be embodied by a rotary switch. More specifically, a rotatable rotary switch 401 has an associated thin display 402 that may be rectangular in shape and that indicates the function name of the rotary switch 401, e.g., "INPUT" as shown at 402a, and that also indicates the position of the switch 401 as shown at 402b. As was the case with the toggle switch 300, when the knob of the rotary switch 401 is set to position "A", "A" is circled and the other two position indications may be grayed out.

In any case, in each of the above examples the thin display is associated with only its own control element to establish a modular unit that may be mounted on a substrate and connected to, e.g., the bus 500 of an electronic component. Because each modular unit may be mounted anywhere on the substrate, the system shown in, e.g., FIG. 4 may have multiple control elements and be layout free, in that each modular unit can be placed anywhere in the substrate (e.g., a control panel).

Referring briefly back to FIG. 4, the rotary switch 400 sends position information to the host processor 105, which returns feedback data for display on the thin display. Similarly, the toggle switch 300 communicates with the host processor 105. The rotary switch 400 and the toggle switch 300 can switch an internal parameter, for example, in the main system 504. They also may have mechanical contacts and switch actual signals. As mentioned above, the processor 105 stores the interface configuration information to RAM 503, which maintains data even while the system is powered off. The processor 105 may also control the main system 504 based on the information from the user interface assembly units shown in the figures, and the processor 105 sends display data to each of the interface assembly units. The function of each control element may be established by properly programming the processor 105.

In some implementations the display data sent from the host processor 105 can be parameterized. For example, a value "50"(%) can be sent to indicate a half of the full circular bar shown in FIGS. 2 and 4. The function/position name may be sent as a series of ASCII codes. Alternatively, if the internal bus 500 has enough bandwidth, graphic data (e.g. bit map data) may be sent to each user interface.

If there is a standardized protocol for display data, it is easy to develop a product. Any vendor's part can coexist on the control bus. The preferred thin display has full color, high contrast, high display speed, is thin, light weight, consumes very little power and is low cost.

In addition to the non-limiting example applications discussed above, the present modular control element with thin display can apply to any suitable user interface part, for example, push button switches, variable capacitor, etc.

Accordingly, it may now be appreciated that the present invention provides an easy and user-friendly manual interface, displays any information such as function/position name, and is configurable by means of the processor 105.

Also, it has very low power consumption and does not require backlight. It is layout free in that it can be placed anywhere on the substrate. The resolution of the control element may be configured by the associated processor, and the present principles are effective for multiple parameter controls/adjustments.

While the particular Electronic Device With A Thin Display is herein shown and described in detail, it is to be understood that the subject matter which is encompassed by the present invention is limited only by the claims.

What is claimed is:

1. A component user interface assembly comprising:
   at least a first thin display connected to a bus of the component;
   at least a first control element adjustable to generate a first electronic input signal to a processor communicating with the bus of the component, the first thin display presenting a feedback indication received from the processor, the feedback indication being representative of the first input signal, the first thin display being associated with no other control element;
   at least a second thin display connected to the bus; and
   at least a second control element adjustable to generate a second electronic input signal to the processor, the second thin display presenting a feedback indication received from the processor, the feedback indication being representative of the second input signal, the second thin display being associated with no other control element, both first and second thin displays being physically separated from each other and both being electrically connected to the processor, wherein
   a first function name is provided by the processor to the first thin display which displays the first function name in a first mode of the first control element, a second function name being displayed by the first thin display in a second mode of the first control element.

2. The user interface assembly component of claim 1, wherein each control element with respective thin display establishes a respective modular unit.

3. The user interface assembly component of claim 2, further comprising a substrate supporting the thin displays with respective control elements.

4. The user interface assembly component of claim 3, wherein a first portion of at least one of the modular units is disposed on a first side of the substrate and a second portion of the at least one modular unit is disposed on a second side of the substrate, a nut being threadably engaged with the second portion.

5. The user interface assembly component of claim 1, wherein the first control element is a rotary encoder with associated knob to adjust the encoder.

6. The user interface assembly component of claim 1, wherein the first control element is a rotary encoder with associated wheel to adjust the encoder.

7. The user interface assembly component of claim 1, wherein the first control element is a rotary switch.

8. The user interface assembly component of claim 1, wherein the first control element is a toggle switch.

* * * * *